United States Patent
Suzuki

(10) Patent No.: US 6,631,311 B2
(45) Date of Patent: Oct. 7, 2003

(54) COOKING UTENSIL

(75) Inventor: Akira Suzuki, Nagoya (JP)

(73) Assignee: Paloma Industries, Limited, Aichi (JP)

(*) Notice: Subject to any disclaimer, the term of this patent is extended or adjusted under 35 U.S.C. 154(b) by 72 days.

(21) Appl. No.: 09/902,356

(22) Filed: Jul. 10, 2001

(65) Prior Publication Data
US 2002/0005121 A1 Jan. 17, 2002

(30) Foreign Application Priority Data
Jul. 14, 2000 (JP) ........................................ 2000-214481

(51) Int. Cl.⁷ .............................................. G05D 23/00
(52) U.S. Cl. ........................ 700/300; 700/299; 99/403
(58) Field of Search ........................ 700/90, 299, 300; 219/492, 494; 99/336, 403; 374/170

(56) References Cited

U.S. PATENT DOCUMENTS

| | | | |
|---|---|---|---|
| 3,979,056 A | * 9/1976 | Barnes | 377/20 |
| 4,437,159 A | 3/1984 | Waugh | 364/400 |
| 4,601,004 A | 7/1986 | Holt et al. | 364/557 |
| 4,625,086 A | * 11/1986 | Karino | 219/720 |
| 4,636,949 A | * 1/1987 | Longabaugh | 700/90 |
| 4,663,710 A | 5/1987 | Waugh et al. | 364/400 |
| 4,672,540 A | 6/1987 | Waugh et al. | 364/400 |
| 4,858,119 A | 8/1989 | Waugh et al. | 364/400 |
| 5,033,449 A | 7/1991 | Hannagan | 126/39 |
| 5,186,097 A | * 2/1993 | Vaseloff et al. | 99/330 |
| 5,352,866 A | 10/1994 | Cartwright et al. | 219/497 |
| 5,398,597 A | * 3/1995 | Jones et al. | 99/330 |
| 5,596,514 A | * 1/1997 | Maher et al. | 700/306 |

FOREIGN PATENT DOCUMENTS

EP 0716827 6/1996

* cited by examiner

Primary Examiner—Albert W. Paladini
Assistant Examiner—Alexander Kosowski
(74) Attorney, Agent, or Firm—Pearson & Pearson, LLP

(57) ABSTRACT

After it has been judged that an oil temperature in an oil vessel of a fryer reaches a predetermined temperature, a specified amount of food is put in the oil vessel. A switch is pressed, and a cooking timer starts in accordance with a preset time, and at the same time, the counting of an actually elapsed time starts. At this time, the count of the cooking timer is displayed on a display portion of the operating panel, along with the count of the actually elapsed time. When it is judged that the time of the cooking timer is up, the counting of the actually elapsed time stops, and the stopped count is displayed on the display portion. In this way, the actually elapsed time is simply and precisely counted.

4 Claims, 4 Drawing Sheets

COOKING UTENSIL

BACKGROUND OF THE INVENTION

1. Field of the Invention

The present invention relates to a cooking utensil such as a fryer for cooking a food using a cooking timer.

2. Description of the Prior Art

A cooking utensil such as a fryer is used for performing cooking basically in accordance with a preset time for each predetermined food. Such a cooking utensil also causes a cooking timer to be operated in accordance with a detected, predetermined cooking temperature (e.g. oil temperature as for a fryer) in consideration of the lowering of an oil temperature because of putting a food in the cooking utensil Thus, as a result, the completion time of the cooking timer is corrected from the original preset time. Although a set time of the cooking timer can be changed arbitrarily, in general, a target time is set as a proper value according to a food. Thus, the fryer executes the following procedures so that the completion time of the cooking timer varied by correction, i.e. an actually elapsed time, coincides with the target time.

<1> A specified mass of the food is put in the fryer at a specified oil temperature, and a cooking timer is started.

<2> Measurement of the actually elapsed time is started by a stopwatch at the same time when the cooking timer is started.

<3> Measurement of the actually elapsed time is completed at the same time when the time of the cooking timer corrected depending on the oil temperature is up.

<4> The measured actually elapsed time is compared with the target time, the set time is corrected so as to eliminate the difference between the elapsed time and the target time, and the corrected time is stored in a computer of the cooking utensil.

As described above, the adjustment of the set time according to the cooking timer is made based on the actually elapsed time manually measured. In addition, the set time is manually corrected. Thus, the set time may be incorrectly stored due to incorrect measurement or calculation. Further, such measurement or calculation is cumbersome and troublesome.

SUMMARY OF THE INVENTION

The present invention has been made in order to solve the foregoing problem. In order to achieve the foregoing object, it is an object of the present invention to provide a cooking utensil capable of easily and precisely measuring completion time of a cooking timer according to adjustment of the set time without any trouble or mistake.

According to a first aspect of the present invention, there is provided a cooking utensil comprising a cooking timer for counting a preset time, wherein there is provided actually elapsed time counting means for automatically starting to count the corrected completion time of said cooking timer at the same time when said cooking timer starts.

According to a second aspect of the present invention, in addition to an effect of the first aspect, in order to calculate a set time based on an actually elapsed time easily and precisely without any trouble or mistake, there is provided a cooking utensil, comprising computation means for comparing an actually elapsed time obtained by actually elapsed time counting means with a preset target time, and computing a newly set time of the cooking timer so that said actually elapsed time coincides with said target time according to the comparison result.

According to a third aspect of the present invention, in addition to an effect of the second aspect, in order to update a set time easily and precisely without any trouble or mistake, there is provided a cooking utensil comprising update means capable of updating a newly set time obtained by computation means as the set time of the cooking timer.

According to a fourth aspect of the present invention, in addition to an effect of any of the first to third aspects, there is provided a cooking utensil, wherein, when a pulse burner is employed for cooking means, the counting of the cooking timer is not started during initial combustion after power has been turned ON in order to obtain a set time or an actually elapsed time precisely.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate presently preferred embodiment of the present invention and, together with the general description given above and the detailed description of the preferred embodiment given below, serve to explain the principle of the present invention.

DETAILED DESCRIPTION OF THE INVENTION

Hereinafter, a preferred embodiment of the present invention will be described with reference to the accompanying drawings.

Figure 1:
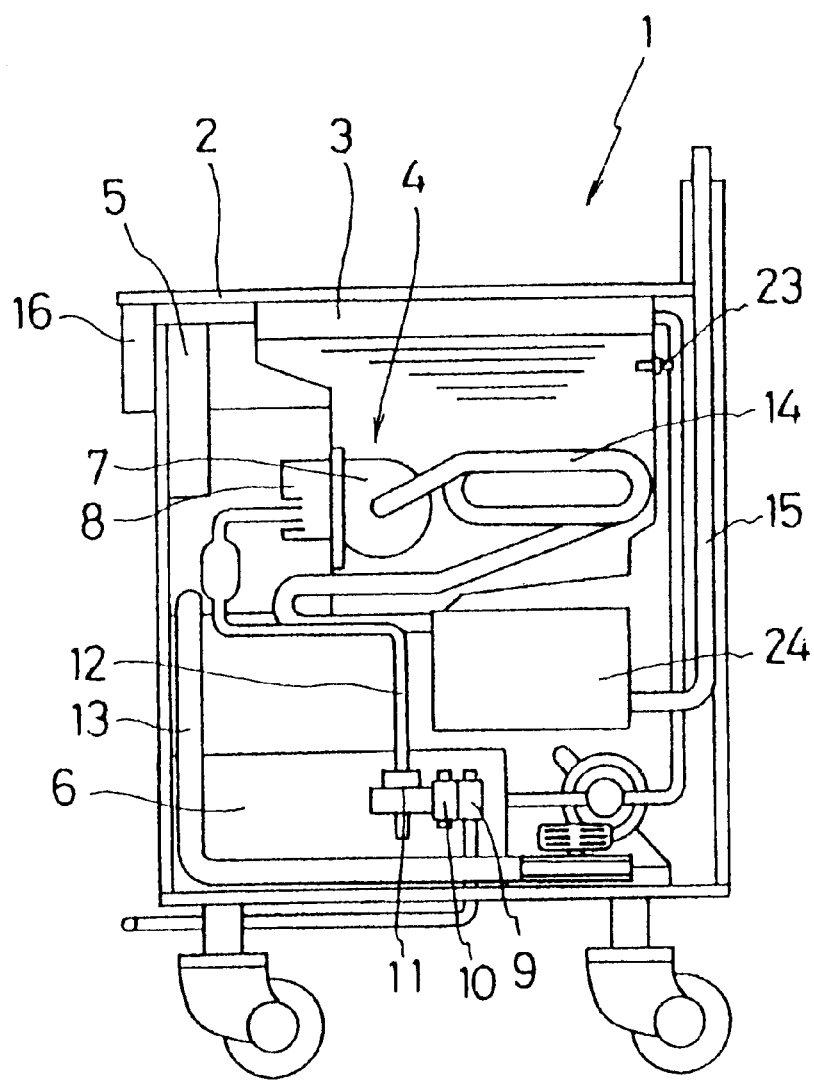
FIG. 1 is an illustrative view of a fryer.

FIG. 1 is an illustrative view entirely illustrating a commercial fryer (hereinafter, referred to as a "fryer") as an example of a cooking utensil. A fryer 1 is provided in a casing 2 with a pair of left and right oil vessels 3, 3 filled with cooking oil (hereinafter, referred to as "oil") for frying a food; a pulse burner 4 provided in each oil vessel 3 for heating up the oil; a controller 5 for mainly controlling combustion of the pulse burner 4; and an oil tank 6 for temporarily reserving oil in order to filtrate the oil contained in the oil vessels 3, 3.

The pulse burner 4 has a combustion chamber 7 formed in the oil vessel 3 and a mixing chamber 8 that communicates with the combustion chamber 7 outside of the oil vessel 3. The mixing chamber 8 is connected to a gas pipe 12 for supplying a fuel gas provided with, from the upstream side, an intake solenoid valve 9, a main solenoid valve 10, and a gas governor 11. The mixing chamber 8 is also connected to an air supply pipe 13 comprising a fan for supplying combustion air.

Further, the combustion chamber 7 is communicated with a tail pipe 14 extending through the oil vessel 3, and the tail pipe 14 is connected to an exhaust pipe 15, that opens to the outside of the fryer 1, via a de-coupler 24 at the outside of the oil vessel 3.

Figure 2:
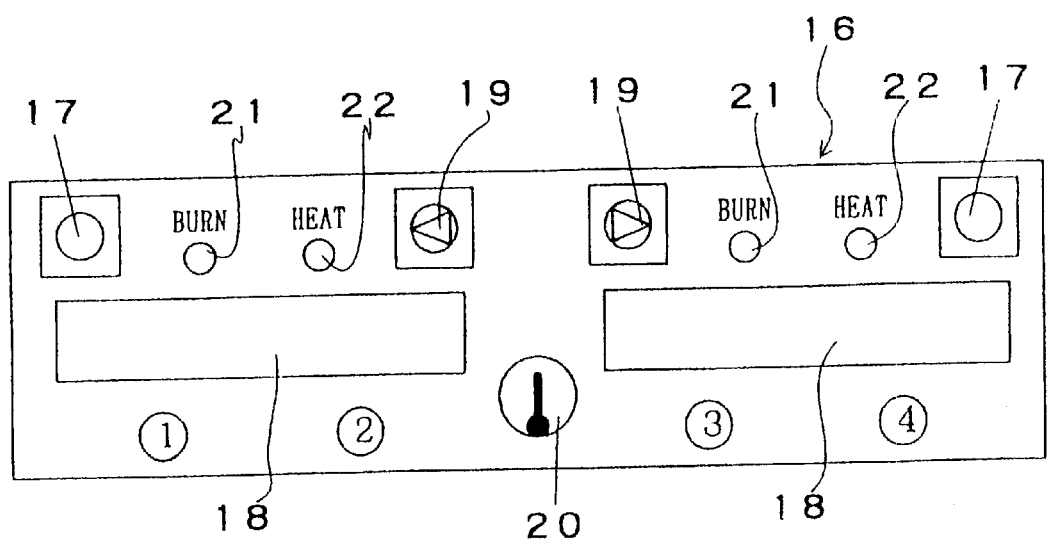
FIG. 2 is an illustrative view of an operating panel.

The controller 5 comprises an operating panel 16 at the front of a casing 2. FIG. 2 is a front view showing the operating panel 16. At the operating panel 16, there are provided operating switches 17, 17; display portions 18, 18 for displaying the name of a food on the menu, temperature or the like; cooking start switches <1> to <4> located in pairs beneath each display portional (hereinafter, referred to as a "switch <1>" or the like); and left and right feed switches 19, 19 for switching a display of the display portion 18, respectively, corresponding to each of the left and right oil vessels 3, and a thermometer switch 20 common to both of the oil vessels 3, 3 is provided between the display portions 18 and 18. Reference numerals 21, 21 denote combustion lamps, and reference numerals 22, 22 denote combustion demanding lamps. In addition, the controller 5 comprises a CPU (a central processing unit) for controlling operation of the fryer 1; a ROM having a control program stored therein; a PAM storing various types of control data; and an interface for data exchange. This CPU delivers a control command to each portion of the equipment in accordance with a program read out from the ROM, and performs processing according to data outputted from each portion of the equipment. A temperature sensor 23 provided at the oil vessel 3 and a variety of switches provided on the operating panel 16 are connected to the input side of the CPU. Each of the solenoid valves, a fan motor, various types of lamps and the like are connected to the output side of the CPU.

Therefore, in a normal mode, each switch is operated on the operating panel 16, thereby making it possible to implement normal operation control for selecting food, cooking or displaying an oil temperature For example, when a left operating switch 17 is pressed, the pulse burner 4 operates to implement ON/OFF control for switching combustion and a combustion stop by opening and closing the main solenoid valve 10 based on a signal from the temperature sensor 23, and to maintain the oil temperature in the oil vessel 3 in a predetermined range. Here, on the display portion 18, a rood on the menu (for example, potato or the like) is displayed. By pressing a feed switch 19, a target food can be selected and displayed. Thereafter, when a switch <1> is pressed after putting a food in the oil vessel 3, the counting of the preset cooking time for the selected food is started. Then, when the cooking time terminates, the switch <1> blinks, and the alarm goes off, indicating that the cooking has terminated. In this case, there is additionally provided a correction function for correcting a completion time of the cooking timer based on the oil temperature obtained from a thermometer sensor 23 in consideration of the drop in oil temperature owing to a food put in the fryer 1.

On the operating panel 16, apart from use in such a normal mode, use in a special mode is available to enable to set a timer or a temperature used in a normal mode, change of various names or the like. Specifically, the special mode includes: a program mode for setting parameters used for cooking of each food; a setup mode for providing various types of settings other than food, such as language setting, sound-level control, or temperature calibration; a maintenance informing mode for verifying what kind of maintenance should be performed and for checking up on the completion when a maintenance time is informed in a normal mode; a maintenance time setting mode for setting time to inform maintenance; a cooking time adjustment mode for automatically measuring and adjusting a cooking timer; and a boil-out mode for boiling the oil vessel 3.

Figure 3:
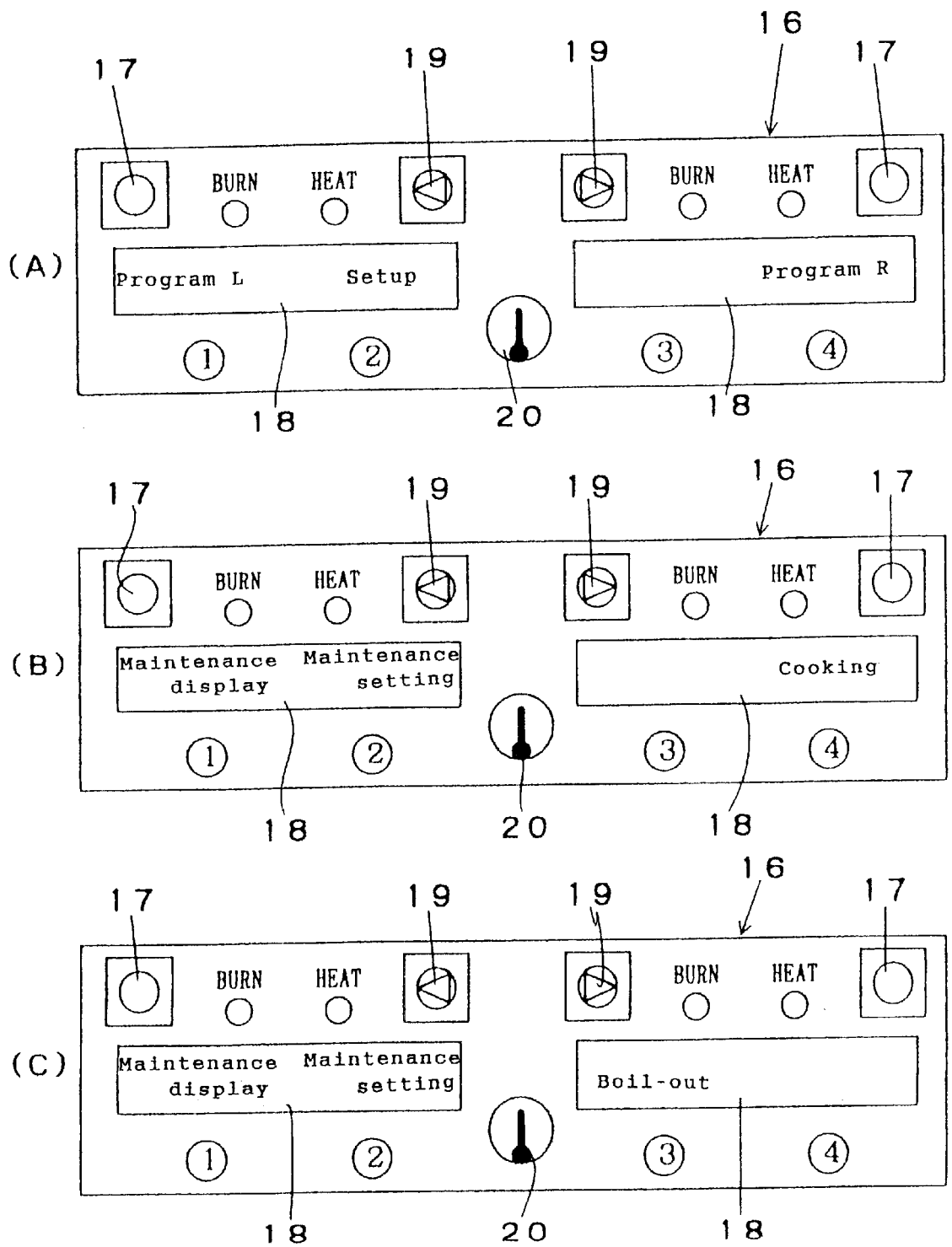
FIG. 3A is an illustrative view of an operating panel when a specific mode selection screen 1 is displayed.
FIG. 3B is an illustrative view of an operating panel when a specific mode selection screen 2-1 is displayed.
FIG. 3C is an illustrative view of an operating panel when a specific mode selection screen 2-2 is displayed.

During switching to any one of these special modes, when the left and right switches 19, 19 are pressed for three seconds, a special mode selection screen 1 is displayed as shown in FIG. 3A. Then, when the right feed switch 19 is pressed, a special mode selection screen 2-1 shown in FIG. 3B or a special mode selection switch 2-2 shown in FIG. 3C is displayed according as whether or not the operating switch 17 is turned ON. That is, in a cooking time adjustment mode, a cooking timer is adjusted while actual operation is made. Thus, only in the case where switching to the special mode is established while the operating switch 17 is turned ON, the screen is displayed as shown in FIG. 3B. In a boil-out mode, cold or hot water is poured into the oil vessel 3, and is boiled. Thus, only in the case where switching to the special mode is established while the operating switch 17 is turned OFF, the screen is displayed as shown in FIG. 3C in order to prevent the boil-out mode from implementing when there is oil in the oil vessel 3.

Figure 4:
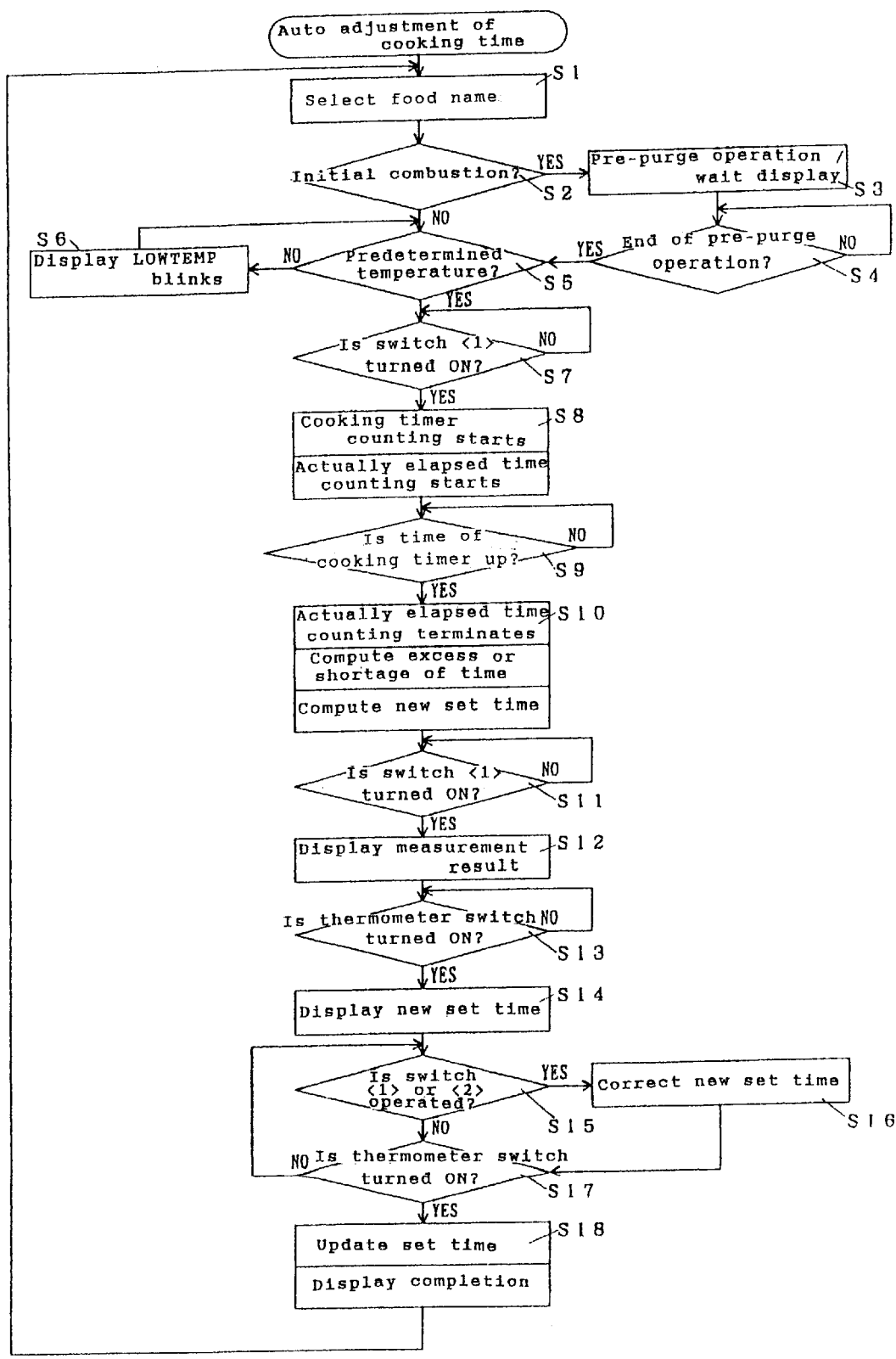
FIG. 4 is a flow chart of auto adjustment of a cooking time.

When the special mode selection switch 2-1 is thus displayed, the cooking time auto adjustment mode is selected by pressing the switch <4> that corresponds to the display "cooking" of the cooking time auto adjustment. Hereinafter, a case in which the cooking time auto adjustment is made for the left oil vessel 3 will be described with reference to the flow chart shown in FIG. 4.

First, at the step S1, the name of a food on the menu for performing auto adjustment is selected. When switching to the cooking time auto adjustment mode is established, the name of the food for auto adjustment (such as "potato") and a display "timer Adj" blink at the display portion 18 (in the cooking time auto adjustment mode, these name and display always blink in order to call an operator's attention). Then, the left feedswitch 19 is pressed to scroll the names of the foods on the menu, and the name of target food can be selected.

Next, in the controller 5, it is judged whether or not the pulse burner 4 performs initial combustion at the step S2. When it is affirmatively judged, the controller 5 performs a pre-purge operation for driving a fan for a predetermined period of time and purging the gas or the like that remains in the combustion chamber 7, tail pipe 14 or the like to the outside of the utensil at the step S3. In addition, the controller 5 causes the display portion 18 to display a message "Please wait for a while" instead of the display "timer Adj". If it is negatively judged at the step S2 or if the pre-purge terminates at the step S4, it is judged whether or not the oil temperature in the oil vessel 3 reaches a predetermined temperature (for example, 180° C.) for performing auto adjustment. If it is negatively judged, the name of the food or the like and a display "LOWTEMP" are alternately blinked on the display 18 at the step S6. Therefore, auto adjustment is not executed while this "LOWTEMP" is displayed.

When it is affirmatively judged at the step 5, and the display "LOWTEMP" disappears, auto adjustment is feasible. Then, a specified amount of food is put in the oil vessel 3, and the switch <1> is pressed at the step S7. Then, at the step S8, the preset cooking timer for each food starts, and at the same time, the counting of the actual elapsed time starts. At this time, the count of the cooking timer is displayed on the left of the display portion 18, and the count of the actual elapsed time is displayed adjacently together. Then, when it is judged at the step S9 that the time of the cooking time is up, the counting or the actual elapsed time stops at the step S10. However, this cooking timer provides a correction function for correcting the cooking timer completion time in accordance with the temperature of the oil in the oil vessel 3, as described previously. Thus, in the case where the cooking timer completion time is varied from a set time, the varied time is displayed as an actually elapsed time.

When the actually elapsed time is thus obtained, the controller 5 computes an excess or shortage of time by subtracting the target time preset and stored for each food from the actually elapsed time (actually elapsed time−target time). In addition, based on the excess or shortage of time, the controller 5 computes a newly set time by subtracting the excess or shortage of time from the current set time (current set time−excess or shortage of time). Therefore, when the switch <1> is pressed at the step S11, the display portion 18 displays the target time, the excess or shortage of time and the actually elapsed time, respectively, as the measurement result (S12). For example, assuming that the target time is 3 minutes and 45 seconds, and the actually elapsed time is 4 minutes and 0 seconds, a display "3' 45+15S=4'00" or the like appears.

Then, when a thermometer switch 20 is pressed at the step S13, the display portion 18 displays the current set time and the computed new set time together (S14). For example, assuming that the current set time is 3 minutes and 45 seconds, the new set time is obtained as 3 minutes and 30 seconds by subtracting the excess or shortage of time 15S from the current set time. Thus, the display portion 18 displays "3'45>>3'30".

When this new set time is displayed at the step S14, the switches <1> and <2> function as correction switches capable of increasing or decreasing the new set time on the display portion 18. Thus, when an operation of the switches <1> and <2> is checked at the step S15, the new set time can be corrected at the step S16. In addition, when a new set time is displayed, the thermometer switch 20 functions as a switch for updating the new set time. When an operation of the thermometer switch 20 is checked at the step S17, the set time is updated to the new set time at the step S18. In addition, the display portion 18 displays a message such as "Completed" for three seconds, and the food selection display of the step S1 is restored. Furthers in the case of making auto adjustment for another kind of food on the menu as well, the above operation may be repeated. The cooking time auto adjustment mode is terminated by turning OFF the operating switch 17.

In this way, according to the above embodiment, actually elapsed time counting means is provided at the fryer 1 so as to automatically count the corrected cooking timer completion time (actually elapsed time). Stop watch, troublesome by its operation or the like is eliminated, thus making it possible to simply and precisely measure the actually elapsed time according to adjustment of the set time.

In addition, there is provided computing means for computing an excess or shortage of time from the obtained, actually elapsed time and a target time, and computing a new set time of the cooking timer so that the actually elapsed time coincides with the target time based on such an excess or shortage of time, thereby an operator's incorrect calculation is eliminated, and the new set time can be simply and precisely obtained. Similarly, the new set time obtained by the above computation can be updated intact as a set time of the cooking timer, thus making it possible to precisely update the set time.

Further, in the above embodiment, there is provided an arrangement such that the counting of the cooking timer is disabled from starting during initial combustion after the power of the pulse burner 4 has been turned ON. Thus, there is no danger that the set time or actually elapsed time is incorrectly counted, and the set time and actually elapsed time can be precisely obtained even in the case where the pulse burner 4 is employed.

Although the above embodiment describes a fryer using a pulse burner as cooking means, a ceramic burner or the like located at the bottom or side of the oil vessel may be employed in the present invention. In this case, there is no need to wait a pre-purge time. In addition, although the above embodiment describes a fryer that is operated for each of the two oil vessels by way of example in which the present invention is applied to the fryer, the present invention is similarly applicable even if one oil vessel is provided. Further, the present invention is applicable to any other cooking utensil without being limited to such a fryer, as long as there is provided a cooking timer corrected by a cooking temperature such as an oven, a grill, or a noodle boiling device.

Advantageous Effect of the Invention

According to a first aspect of the present invention, there is provided actually elapsed time counting means for automatically starting to count a corrected completion time of a cooking timer at the same time when the cooking timer starts, thereby eliminating a stopwatch or troublesome by its operation and making it possible to simply and precisely measure the actually elapsed time according to adjustment of a set time.

According to a second aspect of the present invention, in addition to an effect of the first aspect, there is provided computation means for comparing an actually elapsed time obtained by actually elapsed time counting means with a preset target time, and computing a newly set time of the cooking timer so that said actually elapsed time coincides with said target time according to the comparison result, thereby eliminating an operator's incorrect calculation and making it possible to simply and precisely obtain a new set time.

According to a third aspect of the present invention, in addition to an effect of the second aspect, there is provided update means capable of updating a newly set time obtained by computation means as the set time of the cooking timer, making it possible to precisely execute update the set time.

According to a fourth aspect of the present invention, in addition to an effect of any of the first to third aspects, there is provided a cooking utensil, wherein, when a pulse burner is employed for cooking means, the counting of the cooking timer is prevented from starting during initial combustion after power has been turned ON, thereby the set time or actually elapsed time can be precisely obtained even in the case where the pulse burner is used.

Additional advantages and modifications will readily occur to those skilled in the art. Therefore, the invention in its broader aspect is not limited to the specific details and representative embodiment shown and described herein. Accordingly, various modifications may be made without departing from the spirit or scope of the general inventive concept as defined by the appended claims and their equivalents.

What is claimed is:

1. A cooking utensil comprising a cooking timer for counting a preset time, said cooking utensil being capable of correcting a completion time of said cooking timer according to a cooking temperature, wherein there is provided actually elapsed time counting means for automatically starting to count the corrected completion time of said cooking timer at the same time when said cooking timer starts; and computation means for comparing an actually elapsed time obtained by said actually elapsed time counting means with a preset target time, said computation means computing a newly set time of the cooking timer so that said actually elapsed time coincides with said target time according to a result of said comparing means.

2. The cooking utensil as recited in claim 1 wherein said cooking utensil comprises update means capable of updating a said newly set time obtained by said computation means as the set time of the cooking timer.

3. A cooking utensil as recited in claim 1, wherein a pulse burner is employed for cooking means, the counting of the cooking timer is not started during initial combustion after power has been turned on.

4. A cooking utensil as recited in claim 2, wherein a pulse burner is employed for cooking means, the counting of the cooking timer is not started during initial combustion after power has been turned on.

* * * * *